Nov. 8, 1938. W. GREGORY 2,136,008
CATTLE CHUTE RESTRAINING MEANS FOR USE IN DEHORNING
Filed Oct. 1, 1937 2 Sheets-Sheet 2
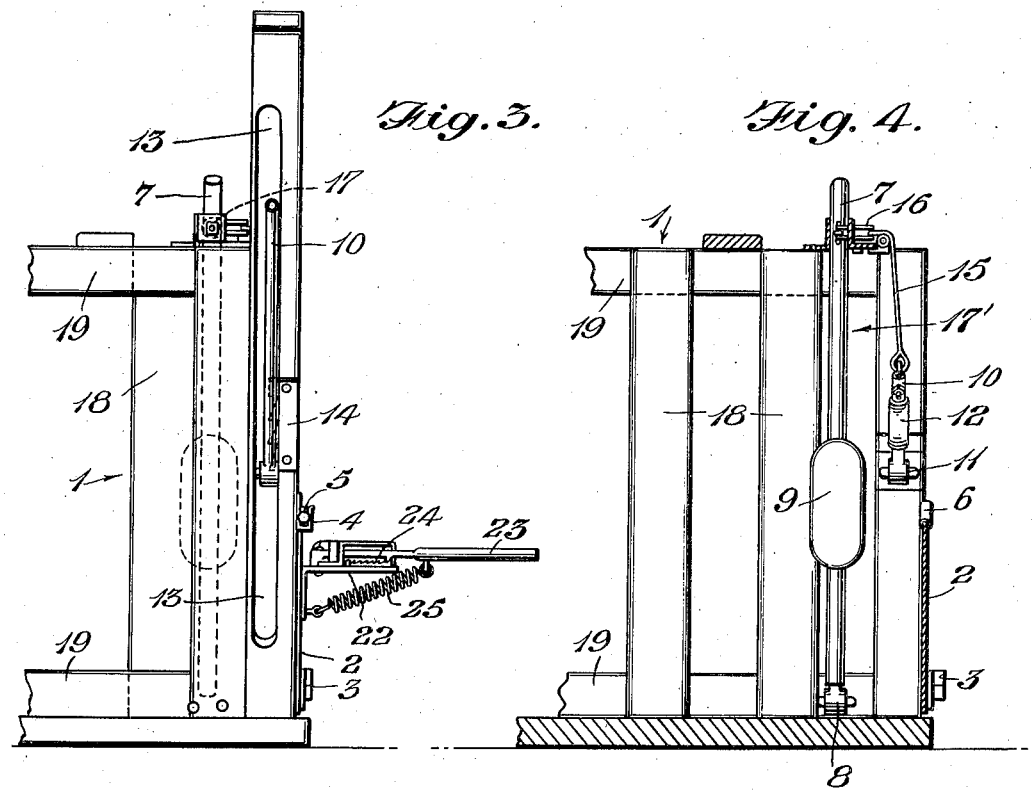
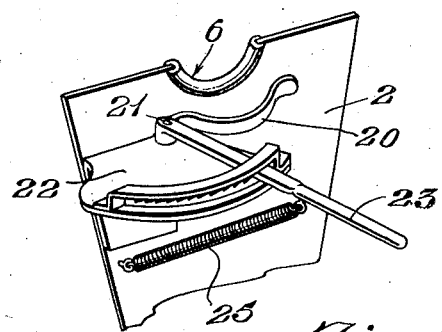
Inventor
Walter Gregory
By C. W. Anderson & Son
Attorney Patented Nov. 8, 1938

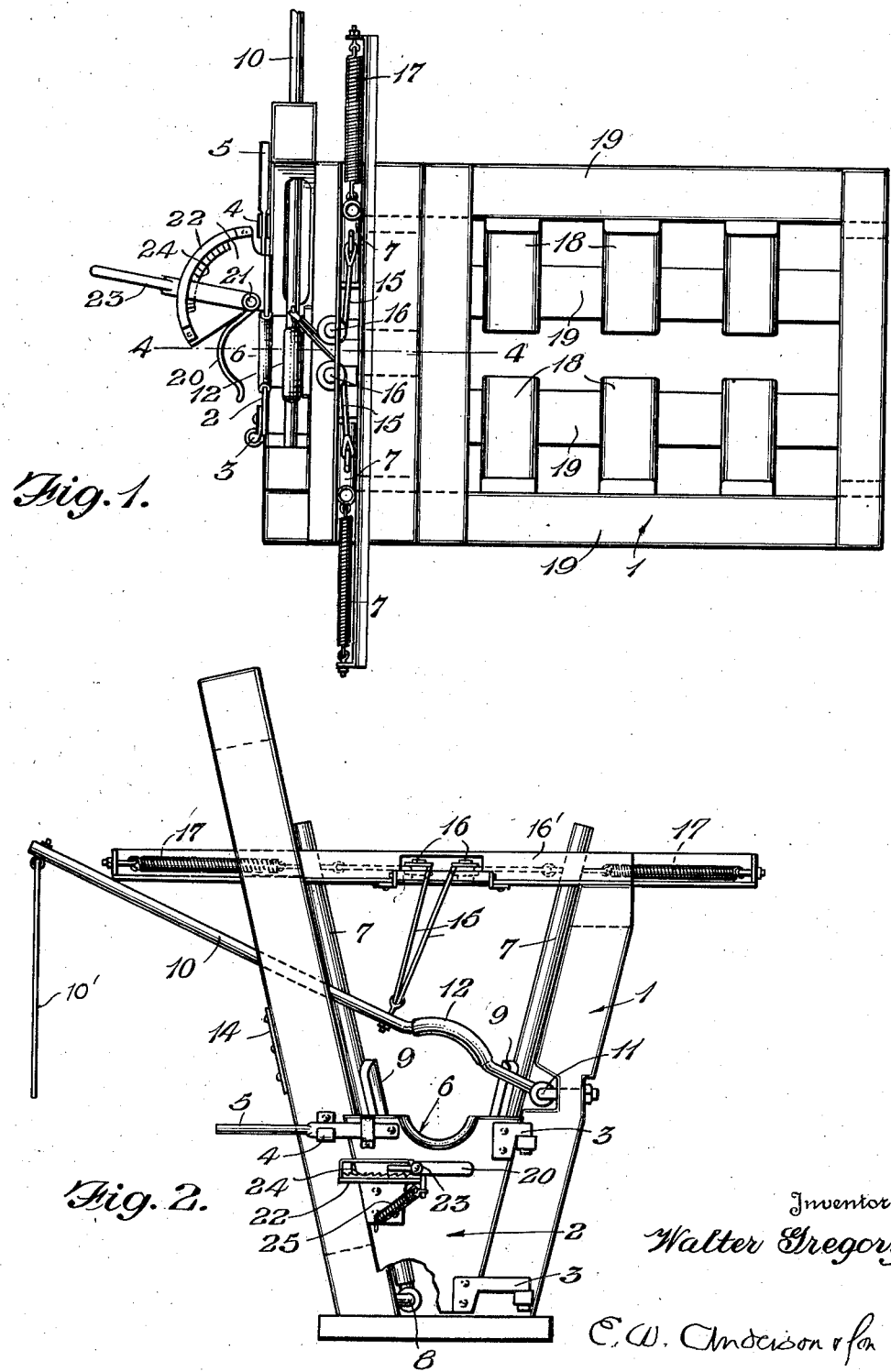

2,136,008

UNITED STATES PATENT OFFICE 2,136,008

CATTLE CHUTE RESTRAINING MEANS FOR USE IN DEHORNING

Walter Gregory, Floyd, N. Mex.

Application October 1, 1937, Serial No. 166,881

3 Claims. (Cl. 119—98)

The invention relates to cattle chute restraining means for use in dehorning mainly, an object of the invention being to facilitate the operation of such restraining means and to reduce the crew or number of men required in such operation. Other objects and advantages will appear hereinafter.

The invention consists in the novel construction and combinations of parts as set forth in the appended claims.

In the accompanying drawings:

Figure 1 is a plan view of the invention.

Figure 2 is a front end view of the same, partly broken away.

Figure 3 is a left side of the same, partly broken away and parts in dotted lines.

Figure 4 is a central longitudinal section of the same on the line 4—4, Figure 1, partly broken away, parts being removed and parts not in section.

Figure 5 is a detail perspective of the gate and the halter bar or lever, partly broken away.

In these drawings, the numeral 1 designates a cattle chute of substantially V-form, wherein the animal is driven, and provided at one end thereof with a gate 2, hinged at one side thereof at 3, and having at the other side a latch device comprising a keeper 4, and a lever 5, pivoted to the gate, said gate having an upper notch 6, to receive the neck of the animal.

Located adjacent the inner side of said gate, the chute is provided with stanchions 7, pivoted at their lower ends at 8, and adapted to be swung together to engage the sides of the neck of the animal, neck grips 9 being provided on the stanchions for better gripping effect, said neck grips being laterally extended and preferably of hard wood so that in case the saw used in dehorning should contact therewith its edge will not be dulled.

Located also adjacent the inner side of the gate and between the gate and the stanchions the chute is provided with a long bar or lever 10, having at one end thereof a fulcrum 11 on the side of the chute where the gate is hinged, said long bar having a curved portion 12 adapted to engage over the neck of the animal to clamp the same between the gate and the long bar when the latter is lowered, the chute being provided with a slot 13 in one of its front posts wherein works the long bar, and toothed means 14 to hold the adjustment of the long bar.

The curved portion 12 of the long bar is preferably provided with a covering of suitable material, to protect the teeth of the saw used in dehorning from being dulled.

Means are provided whereby one man operating the long bar can also control the stanchions, comprising cables 15 attached at one end thereof to the long bar, extending upwardly around guide pulleys 16 and thence laterally in opposite directions to the stanchions. Coiled springs 17 connected at one end to the stanchions and at the other end to the chute are adapted to automatically open the stanchions and raise the long bar to normal position.

In order to avoid interference of the stanchions with the escape of the animal from the chute after the gate is opened, the chute may be provided with lateral recesses 17', adapted to receive the stanchions when normally positioned whereby the stanchions will be normally flush with the inner sides of the chute. For this purpose the chute may be constructed of a series of upright frame members 18 at each side, connected by longitudinal frame members 19.

The nose bar 20 engages over the nose of the animal, and in order to facilitate the control of said nose bar by the man using the saw in dehorning, it is made in the form of a bell-crank lever, fulcrumed at 21 to a horizontal bracket or rest 22 of the gate and whereover the nose bar works, said fulcrum being at the same side of the gate as the latch device 4, 5, the handle arm 23 of the nose bar extending outwardly of the gate. The horizontal bracket or rest 22 is provided with toothed means 24 engaged by the nose bar to hold the adjustment thereof, and a coiled spring 25 attached at one end to the nose bar and at the other end to the gate serves to hold the nose bar engaged with said toothed holding means and to move the nose bar to open position when released from said holding means, thereby avoiding accidental disengagement of the nose bar from said holding means and slaps of the nose bar against the legs of the man using the saw.

While any suitable material may be used, preferably the gate 2 is of boiler plate steel, the notch 6 of the gate is covered with one-inch pipe, welded fast, the rest 22 for the nose bar is of steel bolted to the gate, the long bar 10 is of heavy iron of round cross-section and as the handle end of this long bar or lever is normally raised out of reach, it is provided with a short piece of rope 10' depending therefrom for convenience of operation. The cross pieces 16' of the chute supporting the pulleys 16 are of angle-iron and the stanchions 7, 7, are of metal piping.

The form of the invention herein shown and described is preferred, but it is to be understood that changes may be made with respect to material, shape, size and arrangement of parts, without departure from the spirit of the invention.

I claim:—

1. In a cattle chute restraining means for use in dehorning having a gate hinged to one end of the chute and provided with a latch device and an upper notch to receive the neck of the animal, a nose bar pivoted to said gate and having a curved portion to engage over the nose of the animal, stanchions pivoted at their lower ends to said chute and adapted to be brought together to engage the sides of the neck of the animal, and a long bar pivoted at one end thereof to the chute and adapted to be lowered to engage over the neck of the animal; means for operating said stanchions simultaneously with said long bar whereby one man operating the long bar also controls the stanchions and is enabled to control the gate comprising cables attached to the long bar and extending upwardly and thence laterally to said stanchions and spring means for automatically opening the stanchions and raising the long bar to normal position, said nose bar being a bell-crank lever and the pivot and the handle arm thereof being located at the same side of the gate as said latch device to thereby facilitate the control of the nose bar by the man using the saw in dehorning.

2. In a cattle chute restraining means for use in dehorning having a gate hinged to one end of said chute and having a latch device and an upper notch to receive the neck of the animal, a nose bar pivoted to said gate and having a curved portion to engage over the nose of the animal, stanchions pivoted at their lower ends to the chute and adapted to be swung together to engage the sides of the neck of the animal, and a long bar pivoted at one end to the chute and adapted to be lowered to engage over the neck of the animal; said nose bar being a bell-crank lever and the pivot and the handle arm thereof being located at the same side of the gate as said latch device to thereby facilitate the control of the nose bar by the man using the saw in dehorning.

3. In a cattle chute restraining means for use in dehorning having a gate hinged to one end of the chute and provided with a latch device and an upper notch to receive the neck of the animal, a nose bar pivoted to said gate and having a curved portion to engage over the nose of the animal, stanchions pivoted at their lower ends to said chute and adapted to be swung together to engage the sides of the neck of the animal, and a long bar pivoted at one end to the chute and adapted to be lowered to engage over the neck of the animal; said nose bar being a bell-crank lever and the pivot and the handle arm thereof being located at the same side of the gate as said latch device to thereby facilitate the control of the nose bar by the man using the saw in dehorning, the gate having a horizontal rest whereover the nose bar works, said rest having toothed means to hold the adjustment of the nose bar and a spring to hold the nose bar down to said toothed means.

WALTER GREGORY.